Oct. 13, 1970   N. M. HALLMAN   3,533,754
RADIAL FLOW CATALYTIC REACTOR FOR MIXED PHASE CONTACTING
Filed Nov. 21, 1967
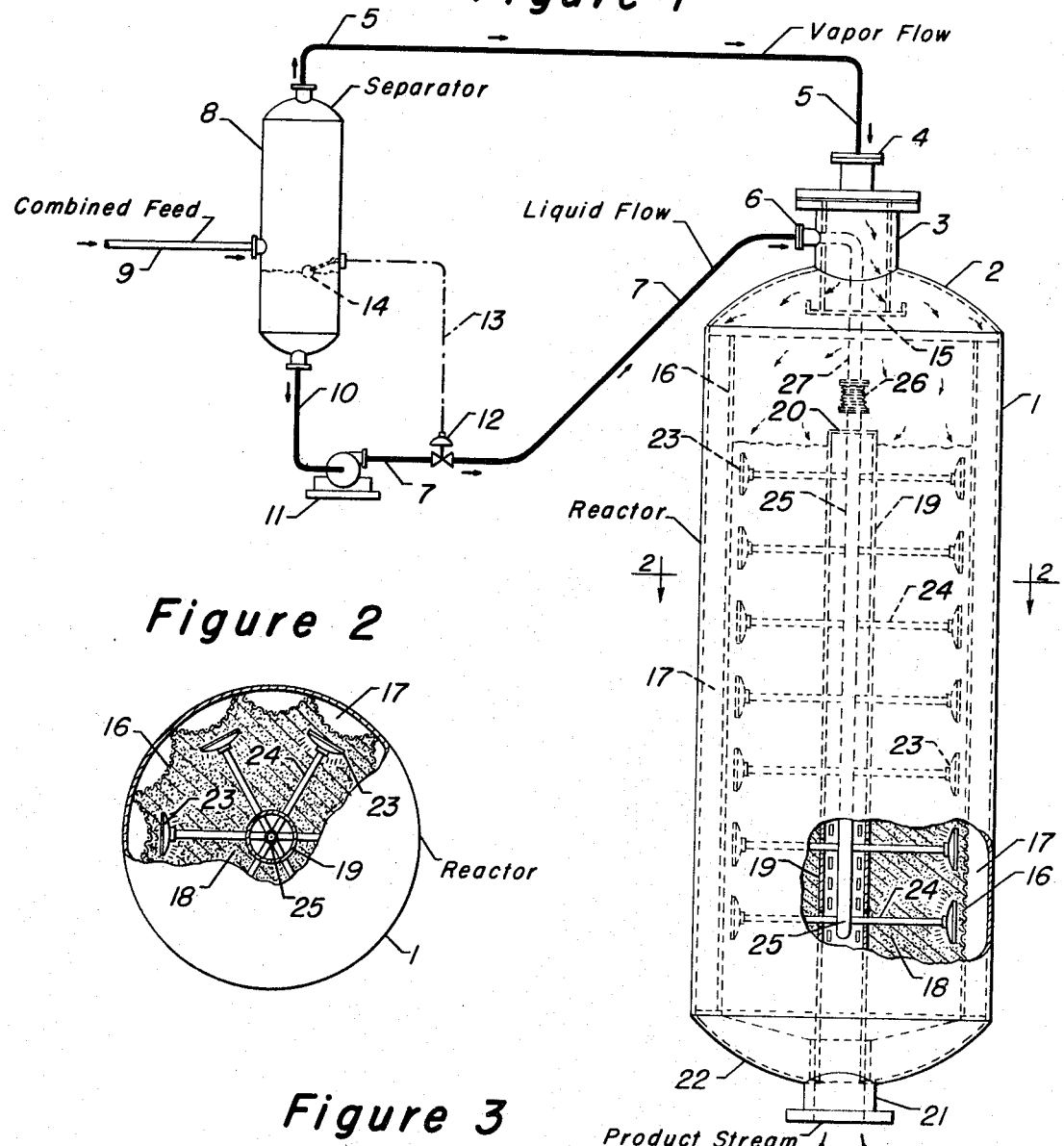
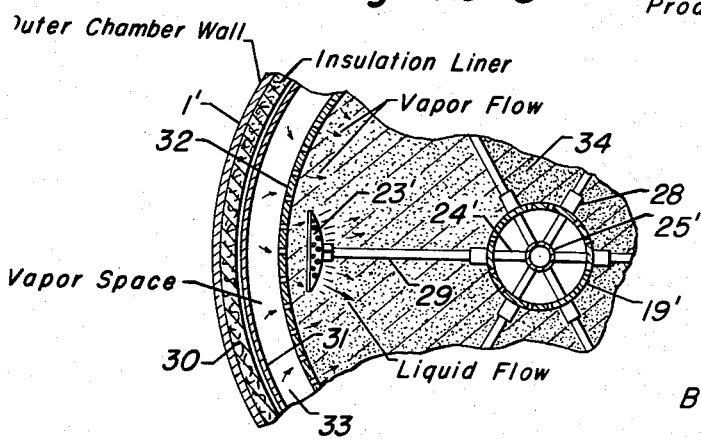
INVENTOR:
Newt M. Hallman
BY:
James R. Hoatson, Jr.
Philip T. Liggett
ATTORNEYS

United States Patent Office 3,533,754
Patented Oct. 13, 1970

3,533,754
RADIAL FLOW CATALYTIC REACTOR FOR MIXED PHASE CONTACTING
Newt M. Hallman, Mount Prospect, Ill., assignor to Universal Oil Products Company, Des Plaines, Ill., a corporation of Delaware
Filed Nov. 21, 1967, Ser. No. 684,769
Int. Cl. B01j 9/04
U.S. Cl. 23—288    4 Claims

ABSTRACT OF THE DISCLOSURE

In a fixed bed catalytic reactor having circumferential vapor space around an annular shaped bed of catalyst to cause radially inward flow to an axial reaction product withdrawal tube, the additional provision of liquid distributing means throughout the outer portion of the annular catalyst bed so as to provide a substantially uniform radially inward flow of liquid along with the vapor carrying through the bed.

---

The present invention is directed to an improved form of radial flow reactor chamber and more particularly to a reactor adapted to handle both vapor and liquid flow streams such that there is uniform co-current radial flow of the separate phases through the bed of contact material.

With vapor phase reactant streams contacting a catalyst bed or other subdivided treating material, there have been reactor constructions and arrangements which provide for conducting the gaseous or vaporous phase stream into a substantially unobstructed outer annular distribution zone which circumscribes an annular bed of material such that there may be a radial inward flow to the perforated central withdrawal pipe or tubular means in turn conducting stream to the outlet port. Conversely, the flow of the vaporous stream may initially lead into an axial distribution zone so that there is an outward radial flow through the annular bed of contact material into a circumscribing annular form collection zone for the reaction product stream. However, for mixed phase streams, it has been the practice to introduce the entire stream into a "downflow" type of reaction zone so as to effect the contacting of a particular catalyst, or other contact material, as a descending stream, with perhaps some internal baffling or distribution means being utilized to assist in effecting a redistribution of the liquid and vapors and to preclude channeling thereof.

When a relatively large quantity of catalyst or materials is necessary, the economics of construction usually provides that there is a substantially long vertical flow and a resulting high length to diameter ratio for the contact chamber. This in turn results in an undesirable pressure drop problem because of the long flow path and the requirement for high power pumping means in order to assure an adequate flow rate through the elongated zone.

In one aspect, it may be considered a feature of the present invention to utilize a system where there is a preliminary separation of the mixed phase reactant stream so as to provide separate introduction of the vapor and liquid streams into the reactor chamber maintaining the subdivided contact material. The chamber in turn is provided with means to effect a radial flow through an annular shaped contact bed in a similar manner as has been accomplished with vapor phase contacting so as to obtain the advantages of the low pressure drop and substantial uniform flow therethrough.

It, therefore, may be considered a principal object of the present invention to obtain the advantages of radial flow through an annular bed of catalyst, or other contact material, and, in addition, provide for radial uniform co-current flow of a liquid stream through substantially the entire annular bed of material.

Stated in another manner, it may also be considered an object of the present invention to provide liquid conducting means to a multiplicity of liquid nozzles or distributor means adjacent to the peripheral surface of the contact bed such that there is a substantially uniform liquid distribution available for radial flow through the bed to a product stream collection section.

In a broad aspect, the present invention provides a reactor adapted for contacting a bed of particulated material with both liquid and vapor phase streams, which comprises in combination, an elongated pressure tight chamber having separate liquid and vapor stream inlet means thereto and a product outlet port therefrom, perforate particle retaining partitioning means spaced closely adjacent the interior wall of said chamber to provide encompassing unobstructed vapor distributing space between the latter and said chamber wall, passageway means to such space from said vapor stream inlet means, whereby vapor may be distributed radially inward through the interior of the chamber, a perforated tubular member with a closed internal end extending axially into said chamber and having on open end connecting with said product outlet port, said tubular member and said partitioning means thus positioned to retain a contact material in an annular bed with said chamber, liquid distributing header means extending into said chamber and connective with said liquid inlet means thereto, and a multiplicity of conduit means each having liquid distributor means therefrom which connect to said header means, said distributor means being positioned in uniformly spaced locations adjacent sad partitioning means, whereby resulting distributed liquid will flow radially inward through said annular shaped particle bed in a co-current flow with the vapor stream to said perforate tubular member.

Generally, liquid phase distribution means will be accomplished by providing conduit or header means down through the central portion of the reactor chamber and through the centrally positioned perforate tubular member, with the fluid distribution pipes carrying from the header means to the multiplicity of liquid distributor means. However, it is not intended to limit the invention to any one predetermined construction for the introduction of the liquid phase stream into the reactor chamber nor to any one piping arrangement for effecting the multiple level distribution of liquid to the uniformly spaced distributor means. In other words, the header or inlet piping means may readily carry down through the chamber in a zone adjacent the outer periphery of the contact bed.

While the embodiment of the invention set forth hereinbefore provides for an inward radial flow of both the vapor and liquid phase streams, it is to be pointed out that there may be an outward radial flow of both the vapor and liquid streams through the annular bed of contact material. In other words, by placing the multiplicity of liquid distributor means vertically along the inner portion of the annular shaped contact bed and by effecting the introduction of the vapor phase stream in the central perforate tubular member, there may be a co-current flow of both the vapor and liquid phase streams through the entire height of the contact bed such that the resulting reaction fluid stream is collected in the unobstructed space surrounding the contact bed and means may be provided for withdrawing a product stream from such space.

Reference to the accompanying drawing and the following description thereof will serve to illustrate the improved reactor construction and at the same time additional advantageous features will be pointed out in connection therewith.

DESCRIPTION OF THE DRAWING

FIG. 1 of the drawing is a diagrammatic elevational view of a reactor chamber, partially in section adapted to accommodate separately introduced liquid and vapor phase streams.

FIG. 2 of the drawing is a partial sectional plan view, as indicated by the line 2—2 in FIG. 1 of the drawing.

FIG. 3 of the drawing indicates, in a partial sectional plan view, a modified liquid distribution arrangement being provided within an insulated and lined reactor chamber.

Referring now particularly to FIGS. 1 and 2 of the drawing, there is shown an elongated vertically disposed reactor chamber 1 having an upper head section 2 with a flanged nozzle 3 which in turn has a smaller sized inlet nozzle 4 adapted to accommodate an incoming vapor flow from line 5. The side portion of the larger nozzle 3 is provided with an inlet nozzle 6 which in turn is adapted to accommodate an incoming liquid flow from line 7. Merely for purposes of illustration and not by way of limitation, there is shown diagrammatically a separator chamber 8 which may be utilized to receive a combined feed stream from line 9 and effect a separation of such stream to have vapor carrying into line 5 while a liquid flow carries to the lower end of chamber 8 into line 10. The liquid from line 10 in turn carries through pump means 11 into line 7 having control valve 12 with the latter shown connecting by means of line 13 to level control means 14 on the side of the separator chamber 8. The level control means 14 of course provides for a regulated flow of the liquid stream through line 7 into the reactor chamber 1.

Internally within the reactor chamber 1 is provided a suspended baffle plate 15 such that there will be a lateral deflection of the incoming vapor stream from line 5 and inlet nozzle 4. Also, within chamber 1, as best shown in FIG. 2, there are a plurality of perforate plate or screen sections 16 which are spaced inwardly from the internal wall of chamber 1 so as to provide a substantially unobstructed space 17 for vapor distribution adjacent the inside wall of chamber 1. The screen or plate sections 16 will have perforations sized to hold an inner confined bed of catalyst or other contact material 18 but of course will readily permit the radial inward flow of the vapor phase stream which is introduced into the reactor chamber 1. For purposes of structural rigidity, the screen sections 16 are shown to be in an arched form so as to form a scalloped ring arrangement when considered in plan view. In other words, the arch or scallop form will better withstand the lateral pressure exerted from the packed bed 18.

In an alternate construction, there may be used a continuous circular form perforate plate or ring section which is spaced from the inner wall of the chamber and a plurality of suitable reinforcing stiffeners or rib members can be utilized at spaced points around the space 17 so as to preclude the stretching or excessive deformation of the perforate partitioning screen from the catalyst bed.

Within the central portion of the chamber 1 there is provided a perforated tubular member 19 which has a closed upper end portion 20 and a lower open end adapted to communicate with an outlet nozzle 21, in turn extending from the lower head 22 of chamber 1. The tubular member 19 provides means for withdrawing a resulting reaction product stream from the central portion of the chamber 1 by virtue of a radial inward flow to such tubular member 19 throughout the entire height of the contact bed 18.

In accordance with the present embodiment of the invention, there is also indicated means for distributing the liquid phase stream from line 7 through the use of a plurality of liquid distributors 23 which are positioned in a uniform spaced manner throughout the height of the contact bed 18 and around the periphery thereof. The positioning of distributors 23 provides a resulting inward radial flow of the liquid medium through bed 18 toward perforate collection member 19 in a co-current flow with the vapor stream in turn being passed radially inwardly through the bed 18 from the distribution space 17. The multiplicity of liquid distributor means 23 are indicated as being provided with the liquid reactant stream from nozzle 6 by way of radially disposed pipes 24 which in turn are shown connecting with an axially disposed header pipe 25. The latter in turn is shown connecting through expansion joint 26 to line 27 and inlet nozzle 6.

The plurality of distribution pipes 24 carrying to the distributing nozzle means 23 may be removably attached to the header pipe 25 or, if desired, may be fabricated as a part of the central tubular member 19 and positioned within the chamber 1 at the same time as such member 19 is placed into the chamber and prior to the pouring in of the contact bed 18. On the other hand, where the pipe 25 and lateral pipes 24 are not connected with the central tubular member 19 there shall be suitable expansion slot arrangements provided in the tubular member 19 so as to accommodate differential expansion problems which may exist during the heating up and cooling down of the reactor chamber.

Although not shown in the drawing, a still further modification of the construction and arrangement may provide for the multiplicity of liquid distributor means 23 to be connected to or mounted upon the internal surface of perforate screen member 16. In this case, a modified liquid introduction system may be utilized such that the liquid flow from line 7 is introduced down into the chamber 1 through a plurality of vertically disposed feeder lines from a circular form header which is positioned either along the top or the bottom portion of the reactor chamber 1.

In FIG. 3 of the drawing there is shown still another embodiment of the improved reactor chamber, with the utilization of a central header line 25' having a plurality of short radial distributor pipes 24' carrying to pipe couplings 28 such that there may be an entire central liquid distributing assembly provided as a part of a perforate tubular section 19'. In this case, a plurality of a radially and laterally disposed distributor pipes 29 may carry from the couplings 28 to spray nozzle means 23'. This modified construction system is of advantage in effecting the assembly of the internals of the reactor chamber and at the same time provide for the ready replacement of any of the liquid distributing means 23' without necessity of having to work within the internal portion of the tubular section 19'.

In FIG. 3 it should also be noted that the reactor chamber 1' is provided with internal insulation 30 and internal liner means 31 with a ring-shaped partitioning members 32 being formed of perforate material adapted to provide vapor space 33 and hold an internal bed of contact materials 34.

Each of the embodiments shown in the drawing have been shown to provide a radial inward flow for the distributed vapor and liquid phase streams through the packed contact bed in the reactor chamber; however, as noted hereinbefore, the present separate phase introduction of liquid and vapor may be effected so as to provide an outward radial flow through the contact bed. In other words, in a modified arrangement for the same form of improved reactor construction, there can be made the changed expedient of providing a plurality of liquid distributor nozzle means adjacent the inner tubular member and along the inside peripheral surface of the contact bed of material for its entire height and, at the same time, a reversal in the vapor flow through such bed by effecting a vapor distribution from the inner tubular member toward an outer open space provided along the inside wall of the chamber. For example, in FIG. 1 the vapor flow could be introduced through the nozzle 21 into tubular member 19 and the reaction product stream collected in space 17 along with liquid passing co-currently through the bed 18 from laterally flowing liquid being distributed by nozzle means that are adjacent the external wall of tubular member 19. Of course, with the spray distributor means being adjacent the inner portion of the contact bed, then such spray nozzle means should be constructed and arranged so as to uniformly spray the liquid stream outwardly through the system and away from the inner tubular member 19 so as to accomplish a substantially uniform lateral flow of liquid outwardly and radially toward the collection space 17.

I claim as my invention:

1. A reactor adapted for contacting a bed of particulated material with both liquid and vapor phase streams, which comprises in combination, an elongated pressure tight chamber having separate liquid and vapor stream inlet means thereto and a product outlet port therefrom, perforate particle retaining partitioning means spaced closely adjacent the interior wall of said chamber to provide encompassing unobstructed vapor distributing space between the latter and said chamber wall, passageway means to such space from said vapor stream inlet means, whereby vapor may be distributed radially inward through the interior of the chamber, a perforated tubular member with a closed internal end extending axially into said chamber and having an open end connecting with said product outlet port, said tubular member and said partitioning means thus positioned to retain a contact material in an annular bed within said chamber, said tubular member extending through the entire bed of contact material, liquid distributing header means extending longitudinally through said chamber and connective with said liquid inlet means thereto, and a multiplicity of laterally extending conduit means connecting with said header means, each of said conduit means having liquid distributor means therefrom which are positioned in uniformly spaced locations adjacent said partitioning means, said distributor means including means for feeding liquid into said bed in a radially inward direction whereby resulting distributed liquid will flow radially inward through said annular shaped particle bed in a co-current flow with the vapor stream to said perforate tubular member.

2. The reactor of claim 1 further characterized in that said header means extends axially through said chamber and said lateral conduit means connecting to said liquid distributing means are fabricated as a portion of said perforate tubular member extending through the central portion of said chamber.

3. The reactor of claim 1 further characterized in that said liquid distributor means are removably connected with respect to said lateral conduit means and said header means, whereby each of said liquid distributor means may be attached to or disconnected from the header means.

4. The reactor of claim 1 further characterized in that said outlet port of said chamber is at an end opposite of said vapor inlet means whereby the reaction product stream reaching said perforate tubular member is discharged from said reactor chamber at the end opposite the vapor inlet to the chamber.

References Cited

UNITED STATES PATENTS

| | | | |
|---|---|---|---|
| 2,459,531 | 1/1949 | Jones | 261—94 |
| 2,683,654 | 7/1954 | Bergman | 23—288 |
| 2,886,517 | 5/1959 | Patton et al. | 23—288 X |
| 3,167,399 | 1/1965 | Hansen | 23—288 |

JOSEPH SCOVRONEK, Primary Examiner

U.S. Cl. X.R.

23—283, 285; 261—98